United States Patent
Fujihira et al.

(10) Patent No.: US 11,697,426 B2
(45) Date of Patent: Jul. 11, 2023

(54) IN-VEHICLE SYSTEM WITH ABNORMALITY DETECTION USING TWO SEPARATE NETWORKS

(71) Applicant: YAZAKI CORPORATION, Tokyo (JP)

(72) Inventors: Katsuya Fujihira, Shizuoka (JP); You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 71 days.

(21) Appl. No.: 16/870,894

(22) Filed: May 8, 2020

(65) Prior Publication Data

US 2020/0269869 A1    Aug. 27, 2020

Related U.S. Application Data

(63) Continuation of application No. PCT/JP2018/041528, filed on Nov. 8, 2018.

(30) Foreign Application Priority Data

Dec. 12, 2017   (JP) ................................ 2017-237418

(51) Int. Cl.
    *B60W 60/00*      (2020.01)

(52) U.S. Cl.
    CPC ......... *B60W 60/00* (2020.02); *B60W 2556/45* (2020.02)

(58) Field of Classification Search
    CPC .............. B60W 60/00; B60W 2556/45; H04L 12/40189; H04L 2012/40273; B60R 16/023
    See application file for complete search history.

(56) References Cited

U.S. PATENT DOCUMENTS

2011/0223955 A1*   9/2011   Kobayashi .............. H04L 45/00
                                                    455/513
2016/0059853 A1    3/2016   Yamakoshi et al.
(Continued)

FOREIGN PATENT DOCUMENTS

JP      2015-162795 A    9/2015
JP      2016-48819 A    4/2016
(Continued)

OTHER PUBLICATIONS

International Search Report and Written Opinion of the International Search Report for PCT/JP2018/041528 dated Dec. 18, 2018.

*Primary Examiner* — James J Lee
*Assistant Examiner* — Alexander George Matta
(74) *Attorney, Agent, or Firm* — Kenealy Vaidya LLP

(57) ABSTRACT

An in-vehicle system includes: an autonomous driving system device that is mounted in a vehicle and implements autonomous driving of the vehicle; an autonomous driving controller that is configured to control the autonomous driving system device to perform a control related to the autonomous driving of the vehicle; a first network that connects the autonomous driving system device and the autonomous driving controller with a protocol conversion unit interposed therebetween so as to perform communication with each other by using a plurality of different protocols; and a second network that connects the autonomous driving system device and the autonomous driving controller without the protocol conversion unit interposed therebetween so as to perform communication with each other by using a single protocol.

3 Claims, 1 Drawing Sheet

(56) References Cited

U.S. PATENT DOCUMENTS

| | | | |
|---|---|---|---|
| 2017/0237690 A1* | 8/2017 | Kawada | H04L 12/4625 370/402 |
| 2017/0297570 A1* | 10/2017 | Yamakoshi | H04L 12/6418 |
| 2018/0109622 A1* | 4/2018 | Galula | B60R 16/023 |
| 2018/0304828 A1* | 10/2018 | Kitani | B60W 50/06 |
| 2019/0023198 A1* | 1/2019 | Hu | H04L 12/40013 |
| 2019/0097932 A1* | 3/2019 | Buczek | H04L 12/413 |

FOREIGN PATENT DOCUMENTS

| | | |
|---|---|---|
| JP | 2016-141269 A | 8/2016 |
| WO | 2017/064944 A1 | 4/2017 |
| WO | 2017/124867 A1 | 7/2017 |

* cited by examiner

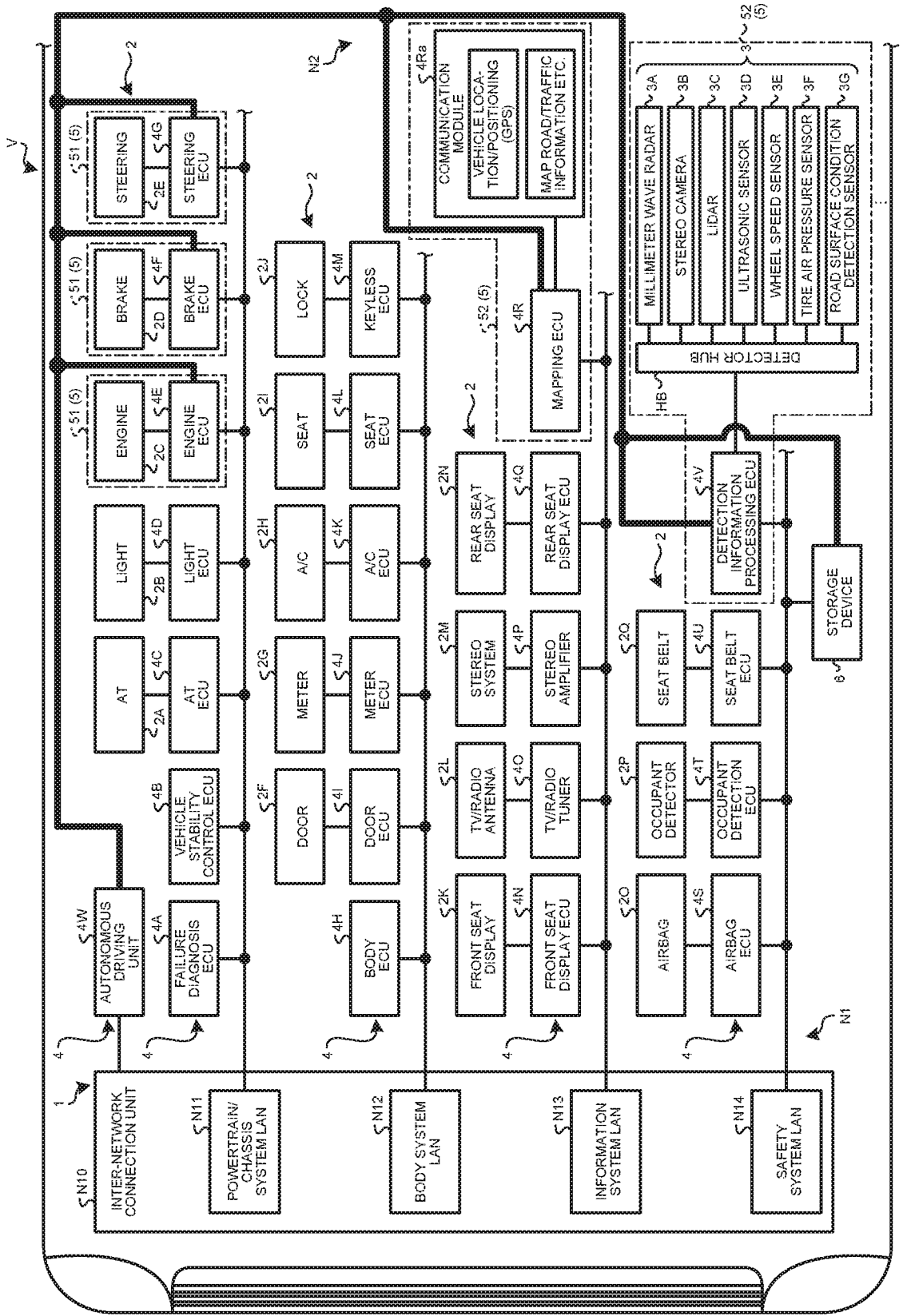

IN-VEHICLE SYSTEM WITH ABNORMALITY DETECTION USING TWO SEPARATE NETWORKS

CROSS-REFERENCE TO RELATED APPLICATION

This application is a continuation application of International Application No. PCT/JP2018/041528 filed on Nov. 8, 2018 which claims the benefit of priority from Japanese Patent Application No. 2017-237418 filed on Dec. 12, 2017 and designating the U.S., the entire contents of which are incorporated herein by reference.

BACKGROUND OF THE INVENTION

1. Field of the Invention

The present invention relates to an in-vehicle system.

2. Description of the Related Art

As a conventional in-vehicle system mounted in a vehicle, for example, Japanese Patent Application Laid-open No. 2015-162795 discloses an in-vehicle information system that configures a network by which a plurality of devices mounted in a vehicle perform communication with each other through a plurality of communication interfaces.

The in-vehicle information system described in Japanese Patent Application Laid-open No. 2015-162795 described above is required to be equipped with a variety of devices in accordance with, for example, the recent flow of autonomous vehicle driving. Even in this case, there is a demand for the in-vehicle information system to ensure more appropriate communication, and there is room for further improvement in this respect.

SUMMARY OF THE INVENTION

The present invention has been made in view of the above circumstances, and an object of the present invention is to provide an in-vehicle system capable of ensuring appropriate communication.

In order to achieve the above mentioned object, an in-vehicle system according to one aspect of the present invention includes an autonomous driving system device that is mounted in a vehicle and implements autonomous driving of the vehicle; an autonomous driving controller that is configured to control the autonomous driving system device to perform a control related to the autonomous driving of the vehicle; a first network that connects the autonomous driving system device and the autonomous driving controller with a protocol conversion unit interposed therebetween so as to perform communication with each other by using a plurality of different protocols, the protocol conversion unit performing protocol conversion; and a second network that connects the autonomous driving system device and the autonomous driving controller without the protocol conversion unit interposed therebetween so as to perform communication with each other by using a single protocol, wherein the autonomous driving system device includes an autonomous driving system operation device of which an operation is controlled by the autonomous driving controller to implement the autonomous driving of the vehicle, and an autonomous driving system detection device which detects information used for the autonomous driving of the vehicle and outputs the information to the autonomous driving controller, the first network connects the autonomous driving system operation device and the autonomous driving system detection device, and the autonomous driving controller with the protocol conversion unit interposed therebetween so as to perform communication with each other, and the second network connects the autonomous driving system operation device and the autonomous driving system detection device, and the autonomous driving controller without the protocol conversion unit interposed therebetween so as to perform communication with each other.

According to another aspect of the present invention, in the in-vehicle system, it is possible to configure that the autonomous driving system detection device includes a plurality of detectors, and the second network includes a detector hub that is interposed between the plurality of detectors and the autonomous driving controller in a mutually communicable manner, aggregates detection information obtained by the plurality of detectors, and transmits the detection information to the autonomous driving controller.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a schematic configuration of an in-vehicle system according to an embodiment.

DETAILED DESCRIPTION OF THE PREFERRED EMBODIMENTS

An embodiment according to the present invention will be described below in detail with reference to the drawings. Note that the present invention is not limited by the embodiment. In addition, components in the following embodiment include those that can be easily replaced by those skilled in the art or those that are substantially the same.

EMBODIMENT

An in-vehicle system 1 of the present embodiment illustrated in FIG. 1 is an in-vehicle network system which is mounted in a vehicle V and in which devices for implementing autonomous driving of the vehicle V are connected by a plurality of networks. The in-vehicle system 1 is implemented by mounting components illustrated in FIG. 1 in the vehicle V. Hereinafter, a configuration of the in-vehicle system 1 will be described in detail with reference to the drawings.

Note that in the in-vehicle system 1 illustrated in FIG. 1, unless otherwise specified, a method of connecting between components to supply power and transmit and receive a control signal, various information, and the like may be any one of wired connection (for example, including optical communication using an optical fiber) using a wiring material such as a cable or an optical fiber, and wireless connection such as wireless communication or non-contact power feeding. Further, the vehicle V to which the in-vehicle system 1 is applied may be a vehicle using a motor or an engine as a drive source, such as an electric vehicle (EV), a hybrid vehicle (HEV), a plug-in hybrid vehicle (PHEV), a gasoline vehicle, or a diesel vehicle. Further, the vehicle V is a vehicle capable of at least autonomous driving. In the autonomous driving of the vehicle V, an automatic control of a behavior of the vehicle V takes precedence over a driving operation performed by a driver of the vehicle V, or is performed without depending on the driving operation performed by the driver, based on a detection result obtained by a detector 3 to be described later. The autonomous driving includes semi-autonomous driving that involves a driving operation performed by the driver to some degree and fully autonomous driving that does not involve the driving operation performed by the driver. Examples of the semi-autonomous driving include driving using an antilock brake system (ABS), vehicle stability control (VSC), adaptive cruise control (ACC), lane keeping assist (LKA), pre-crash safety (PCS), and the like. Examples of the fully autonomous driving include driving in which the vehicle V is autonomously driven to a destination and driving in which a plurality of vehicles V are autonomously driven in a row.

Specifically, the in-vehicle system 1 includes a plurality of in-vehicle devices 2, a plurality of detectors 3, and a control device 4, as illustrated in FIG. 1.

The in-vehicle device 2 is a device which is mounted in the vehicle V and implements various functions. The plurality of in-vehicle devices 2 are provided in the vehicle V. Examples of the plurality of in-vehicle devices 2 may include devices that are installed on the vehicle V at the time of manufacturing the vehicle V, or so-called after-market products that are installed in the vehicle V after the vehicle V is manufactured. Examples of the plurality of in-vehicle devices 2 may include a traveling system actuator, a power source system device, a vehicle environment system device, and a multimedia system device. Examples of the traveling system actuator may include a travel powertrain (an engine, a motor-generator, or a transmission) which is a drive device enabling traveling of the vehicle V, a steering device for steering the vehicle V, and a braking device for braking the vehicle V. Examples of the power supply system device may include a power storage device such as a battery, a capacitor, and a capacitor, an alternator, a motor-generator, a power distribution unit, a power system switching mechanism, a power control box, an inverter, and a converter. Examples of the vehicle environment system device may include various lighting devices such as a headlight, a tail lamp, and a room lamp, an air conditioning device, a wiper device, a mirror, and a seat. Examples of the multimedia system device may include devices such as a navigation device, a stereo system, a meter, and various displays. The plurality of in-vehicle devices 2 illustrated in FIG. 1 include, for example, an automatic transmission (AT) 2A, a light 2B, an engine 2C, a brake 2D, a steering 2E, a door 2F, a meter 2G, an air conditioner (A/C) 2H, a seat 2I, a lock 2J, a front seat display 2K, a television (TV)/radio antenna 2L, a stereo system 2M, a rear seat display 2N, an airbag 20, an occupant detector 2P, and a seat belt 2Q, but are not limited thereto. The AT 2A constitutes the transmission described above. The light 2B constitutes the lighting device described above. The engine 2C is an internal combustion engine which generates power for traveling or power for auxiliary driving. The brake 2D constitutes the above-described braking device. The steering 2E constitutes the steering device described above. The door 2F is attached to a vehicle body of the vehicle V so as to be opened or closed and includes an electric power window and the like. The meter 2G displays various measurement values or information on the vehicle V. The air conditioner (A/C) 2H constitutes the above-described air conditioning device. The seat 2I which is provided in the vehicle V and on which an occupant may seat includes various adjustment mechanisms, a heater, or the like. The lock 2J locks the door 2F.

The front seat display 2K is provided on a front seat side of the vehicle V and displays various images. The TV/radio antenna 2L is an antenna for receiving radio waves of a TV or radio. The stereo system 2M outputs auditory information such as voice information and sound information, or music. The rear seat display 2N is provided on a rear seat side in the vehicle V and displays various images. The airbag 20 is a safety device that is deployed at the time of collision to protect the occupant. The occupant detector 2P detects the occupant based on seating on the seat 2I. The seat belt 2Q is a safety device that restrains the occupant to the seat 2I.

The detector 3 is mounted in the vehicle V and detects various information. The plurality of detectors 3 are provided in the vehicle V. Examples of the plurality of detectors 3 may include a vehicle speed sensor, an acceleration sensor, a steering angle sensor, an accelerator sensor, a brake sensor, a shift position sensor, an airbag deployment switch, a turn signal switch, a seat belt switch, a seat load sensor, a rain sensor, a humidity sensor, a temperature sensor, a current/voltmeter, an imaging device such as a charge-coupled device (CCD) camera, various radars or sonars using infrared rays, millimeter waves, ultrasonic waves, or the like, a global positioning system (GPS) receiver, and various wireless communication devices. The plurality of detectors 3 illustrated in FIG. 1 includes a detector for monitoring the surroundings of the vehicle V as an example. Here, the plurality of detectors 3 are illustrated as including a millimeter wave radar 3A, a stereo camera 3B, a lidar 3C, an ultrasonic sensor 3D, and the like, as detectors for monitoring the surroundings of the vehicle V, but the present invention is not limited thereto. Further, the plurality of detectors 3 are illustrated as including a wheel speed sensor 3E, a tire air pressure sensor 3F, a road surface condition detection sensor 3G, and the like. The millimeter wave radar 3A detects an object existing around the vehicle V by using millimeter waves. The stereo camera 3B captures a stereoscopic image (three-dimensional image) of the surroundings of the vehicle V. The lidar 3C is a so-called laser radar, and detects an object existing around the vehicle V with a laser beam. The ultrasonic sensor 3D detects an object existing around the vehicle V by using ultrasonic waves. The wheel speed sensor 3E detects a rotational speed of the wheel of the vehicle V. The tire air pressure sensor 3F detects an air pressure of a tire mounted on the wheel of the vehicle V. The road surface condition detection sensor 3G detects a state of a road surface on which the wheel of the vehicle V is grounded. Each detector 3 outputs detection information indicating a detection result to the control device 4.

The control device 4 comprehensively controls each part of the in-vehicle system 1. The control device 4 performs various arithmetic processing for controlling the in-vehicle device 2 mounted in the vehicle V based on the detection information indicating the detection result obtained by the plurality of detectors 3. The control device 4 includes an electronic circuit that mainly includes a known microcomputer, the microcomputer including a central processing device such as a central processing unit (CPU), a micro processing unit (MPU), an application specific integrated circuit (ASIC), a field programmable gate array (FPGA), a read only memory (ROM), or a random access memory (RAM), and an interface. The control device 4 executes various programs and applications stored in a storage unit, and as the programs and applications are operated, an output signal is output to each part to perform various processing for implementing various functions. Here, the control device 4 is constituted by a plurality of electronic controllers (ECUs). The control device 4 illustrated in FIG. 1 includes, for example, a failure diagnosis ECU 4A, a vehicle stability control ECU 4B, an AT ECU 4C, a light ECU 4D, an engine ECU 4E, a brake ECU 4F, a steering ECU 4G, a body ECU 4H, a door ECU 4I, a meter ECU 4J, an A/C ECU 4K, and a seat ECU 4L, a keyless ECU 4M, a front seat display ECU 4N, a TV/radio tuner 40, a stereo amplifier 4P, a rear seat display ECU 4Q, a mapping ECU 4R, an airbag ECU 4S, an occupant detection ECU 4T, a seat belt ECU 4U, a detection information processing ECU 4V, an autonomous driving ECU 4W as autonomous driving controller, and the like, but the present invention is not limited thereto. The failure diagnosis ECU 4A performs processing for diagnosing a failure of the in-vehicle device 2. The vehicle stability control ECU 4B performs processing for stabilizing a posture of the vehicle V. The AT ECU 4C is communicably connected to the AT 2A and controls an operation of the AT 2A. The light ECU 4D is communicably connected to the light 2B and controls an operation of the light 2B. The engine ECU 4E is communicably connected to the engine 2C and controls an operation of the engine 2C. The brake ECU 4F is communicably connected to the brake 2D and controls an operation of the brake 2D. The steering ECU 4G is communicably connected to the steering 2E, and controls an operation of the steering 2E. The body ECU 4H comprehensively controls a body system of the vehicle V. The door ECU 4I is communicably connected to the door 2F and controls an operation of the electric power window and the like of the door 2F. The meter ECU 4J is communicably connected to the meter 2G and controls an operation of the meter 2G. The A/C ECU 4K is communicably connected to the A/C 2H and controls an operation of the A/C 2H. The seat ECU 4L is communicably connected to the seat 2I and controls an operation of the seat 2I. The keyless ECU 4M is communicably connected to the lock 2J and controls an operation of the lock 2J. The front seat display ECU 4N is communicably connected to the front seat display 2K and controls an operation of the front seat display 2K. The TV/radio tuner 40 is a tuning circuit that selects radio waves with a specific frequency from radio waves related to a TV, a radio, or the like received by the TV/radio antenna 2L. The stereo amplifier 4P is an amplifying circuit that amplifies an electrical signal corresponding to auditory information to enable output of the amplified signal from the stereo system 2M. The rear seat display ECU 4Q is communicably connected to the rear seat display 2N and controls an operation of the rear seat display 2N. The mapping ECU 4R performs processing related to detection of three-dimensional map information (fixed road map information, a dynamic map, and the like) about the surroundings of the vehicle V or generation of target trajectory information for the autonomous driving. The mapping ECU 4R performs the above-described various processing based on, for example, information on a location of the vehicle V/positioning (GPS) or map road/traffic information (big data from outside the vehicle) obtained by a communication module 4Ra which performs communication with the outside of the vehicle V. The airbag ECU 4S is communicably connected to the airbag 20 and controls an operation of the airbag 20. The occupant detection ECU 4T is communicably connected to the occupant detector 2P and performs processing for detecting an occupant based on an output of the occupant detector 2P. The seat belt ECU 4U is communicably connected to the seat belt 2Q and controls an operation of the seat belt 2Q. The detection information processing ECU 4V performs various processing on detection information obtained by the plurality of detectors 3. For example, the detection information processing ECU 4V performs various processing such as detection of a traveling environment of the vehicle V, detection of obstacles around the vehicle V, detection of white lines, and the like, based on the detection information obtained by the plurality of detectors 3. The autonomous driving ECU 4W can control an autonomous driving system device 5 mounted in the vehicle V to perform a control related to the autonomous driving of the vehicle V.

Here, the autonomous driving system device 5 is a device which is mounted in the vehicle V and implements various functions for implementing the autonomous driving of the vehicle V. More specifically, the autonomous driving system device 5 includes an autonomous driving system operation device 51 and an autonomous driving system detection device 52.

The autonomous driving system operation device 51 is a device of which an operation is controlled by the autonomous driving ECU 4W to implement the autonomous driving of the vehicle V. The autonomous driving system operation device 51 is constituted by, for example, a combination of the engine 2C and the engine ECU 4E, a combination of the brake 2D and the brake ECU 4F, and a combination of the steering 2E and the steering ECU 4G. In other words, the in-vehicle system 1 includes the combination of the engine 2C and the engine ECU 4E, the combination of the brake 2D and the brake ECU 4F, and the combination of the steering 2E and the steering ECU 4G, as the autonomous driving system operation device 51. Here, the engine 2C, the engine ECU 4E, the brake 2D, and the brake ECU 4F constitute a traveling control module which performs an operation for maintaining an inter-vehicle distance or avoiding a collision, as an actual behavior of the vehicle V in the autonomous driving of the vehicle V. The steering 2E and the steering ECU 4G constitute a steering control module which performs an operation for maintaining a lane or maintaining a target trajectory, as an actual behavior of the vehicle V in the autonomous driving of the vehicle V.

Meanwhile, the autonomous driving system detection device 52 is a device which detects information used for the autonomous driving of the vehicle V and outputs the information to the autonomous driving ECU 4W. The autonomous driving system detection device 52 is constituted by, for example, a combination of the plurality of detectors 3 (the millimeter wave radar 3A, the stereo camera 3B, the lidar 3C, the ultrasonic sensor 3D, the wheel speed sensor 3E, the tire air pressure sensor 3F, and the road surface condition detection sensor 3G) and the detection information processing ECU 4V and a combination of the communication module 4Ra and the mapping ECU 4R. In other words, the in-vehicle system 1 includes a combination of the plurality of detectors 3 and the detection information processing ECU 4V and a combination of the communication module 4Ra and the mapping ECU 4R, as the autonomous driving system detection device 52.

Typically, in the in-vehicle system 1, the communication module 4Ra and the mapping ECU 4R which constitute the autonomous driving system detection device 52 constitute a part performing a recognition function in the autonomous driving of the vehicle V. Further, in the in-vehicle system 1, the plurality of detectors 3 and the detection information processing ECU 4V which constitute the autonomous driving system detection device 52 constitute a part performing a detection function in the autonomous driving of the vehicle V. Further, in the in-vehicle system 1, the autonomous driving ECU 4W constitutes a part performing a thinking/determination function in the autonomous driving of the vehicle V. Further, in the in-vehicle system 1, the engine 2C, the engine ECU 4E, the brake 2D, the brake ECU 4F, the steering 2E, and the steering ECU 4G which constitute the autonomous driving system operation device 51 constitute a part performing an operation function in the autonomous driving of the vehicle V. Meanwhile, the autonomous driving ECU 4W controls the autonomous driving system operation device 51 based on three-dimensional map information about the surroundings of the vehicle V and target trajectory information detected and generated by the mapping ECU 4R, respectively, and a traveling environment of the vehicle V, obstacles around the vehicle V, white lines, and the like, detected by the detection information processing ECU 4V. Therefore, the autonomous driving ECU 4W performs a control related to various types of autonomous driving, such as the ABS, the VSC, the ACC, the LKA, the PCS, the driving in which the vehicle V is autonomously driven to a destination, and the driving in which a plurality of vehicles V are autonomously driven in a row as described above.

Further, the in-vehicle system 1 according to the present embodiment includes two systems, a first network N1 and a second network N2, as an in-vehicle local area network (LAN) that communicably connects the autonomous driving ECU 4W and each autonomous driving system device 5 (the autonomous driving system operation device 51 and the autonomous driving system detection device 52) to each other.

The first network N1 is a communication network that connects the autonomous driving system device 5 and the autonomous driving ECU 4W to each other with an inter-network connection unit N10 interposed therebetween as a protocol conversion unit which performs protocol conversion so as to perform communication with each other by using a plurality of different protocols. The first network N1 is also communicably connected to the in-vehicle device 2 and the control device 4, in addition to the autonomous driving system device 5 and the autonomous driving ECU 4W. The first network N1 can be any communication network, regardless of wired or wireless. The first network N1 according to the present embodiment includes, for example, a powertrain/chassis system LAN N11, a body system LAN N12, an information system LAN N13, a safety system LAN N14, and the inter-network connection unit N10 as the protocol conversion unit.

The powertrain/chassis system LAN N11 is a network that mainly performs communication between devices related to a behavior control of the vehicle V. Here, the failure diagnosis ECU 4A, the vehicle stability control ECU 4B, the AT ECU 4C, the light ECU 4D, the engine ECU 4E, the brake ECU 4F, and the steering ECU 4G are communicably connected to the powertrain/chassis system LAN N11. The body system LAN N12 is a network that mainly performs communication between devices related to a control of interior equipment of the vehicle V. Here, the body ECU 4H, the door ECU 4I, the meter ECU 4J, the A/C ECU 4K, the seat ECU 4L, and the keyless ECU 4M are communicably connected to the body system LAN N12. The information system LAN N13 is a network that mainly performs communication between multimedia/entertainment system devices of the vehicle V. Here, the front seat display ECU 4N, the TV/radio tuner 40, the stereo amplifier 4P, the rear seat display ECU 4Q, and the mapping ECU 4R are communicably connected to the information system LAN N13. The safety system LAN N14 is a network that mainly performs communication between devices related to a safety control of the vehicle V. Here, the airbag ECU 4S, the occupant detection ECU 4T, the seat belt ECU 4U, and the detection information processing ECU 4V are communicably connected to the safety system LAN N14. Here, the autonomous driving ECU 4W is configured independently of the powertrain/chassis system LAN N11, the body system LAN N12, the information system LAN N13, and the safety system LAN N14, and is connected to the powertrain/chassis system LAN N11, the body system LAN N12, the information system LAN N13, and the safety system LAN N14 in a mutually communicable manner by the inter-network connection unit N10.

The inter-network connection unit N10 connects the powertrain/chassis system LAN N11, the body system LAN N12, the information system LAN N13, and the safety system LAN N14, and the autonomous driving ECU 4W to each other in a mutually communicable manner. The inter-network connection unit N10 functions as the protocol conversion unit (so-called gateway (G/W) function unit) which performs protocol conversion. The inter-network connection unit N10 may also function as a backbone which connects the networks. The first network N1 connects the powertrain/chassis system LAN N11, the body system LAN N12, the information system LAN N13, and the safety system LAN N14, and the autonomous driving ECU 4W to each other with the inter-network connection unit N10 interposed therebetween so as to perform communication with each other according to a plurality of different protocols. The inter-network connection unit N10 performs protocol conversion for networks with different protocols and distributes information to each network. As for a relationship between the autonomous driving ECU 4W and the autonomous driving system device 5, the first network N1 communicably connects the autonomous driving ECU 4W and the autonomous driving system operation device 51 of the autonomous driving system device 5 to each other through the powertrain/chassis system LAN N11 and the inter-network connection unit N10. In addition, the first network N1 communicably connects the autonomous driving ECU 4W and the autonomous driving system detection device 52 of the autonomous driving system device 5 to each other through the information system LAN N13 or the safety system LAN N14, and the inter-network connection unit N10. Examples of the protocol used in the first network N1 include various communication protocols related to CAN communication, CAN-FD, LIN, CXPI, NFC, Giga-IR, UWB, Ethernet (registered trademark), HDMI (registered trademark), DSI, wireless transmission communication, USB 3.0, Transfer Jet (registered trademark), HomePlug GreenPHY, wireless LAN communication, submillimeter wave communication, PLC, narrow area wireless communication, and weak radio wave communication, but are not limited thereto. Note that functional arrangement of the G/W function unit functioning as the protocol conversion unit is not limited to a central type functional arrangement as illustrated in FIG. 1, but may be area distribution type functional arrangement or domain distribution type functional arrangement. Here, the central type functional arrangement refers to an arrangement form in which the G/W function units are concentrated in one place in the vehicle V. The area distribution type functional arrangement refers to an arrangement form in which the G/W functional units are distributed and arranged for each arbitrary area in the vehicle V, and the plurality of G/W functional units are linked. The domain distribution type functional arrangement refers to an arrangement form in which the G/W functional units are distributed and arranged for each arbitrary domain in the vehicle V, and the plurality of G/W functional units are linked.

Meanwhile, the second network N2 is a communication network that connects the autonomous driving system device 5 and the autonomous driving ECU 4W to each other without the inter-network connection unit N10 interposed therebetween so as to perform communication with each other by using a single protocol such as Ethernet. The second network N2 is a network separate from the first network N1, and is a separate network independent of the first network N1. The second network N2 is a communication network dedicated to an autonomous driving system that connects the autonomous driving system device 5 and the autonomous driving ECU 4W to each other in a mutually communicable manner. The second network N2 can be any communication network, regardless of wired or wireless. The second network N2 connects the engine ECU 4E, the brake ECU 4F, and the steering ECU 4G which constitute the autonomous driving system operation device 51 of the autonomous driving system device 5, and the autonomous driving ECU 4W to each other in a mutually communicable manner. Further, the second network N2 connects the mapping ECU 4R and the detection information processing ECU 4V which constitute the autonomous driving system detection device 52 of the autonomous driving system device 5, and the autonomous driving ECU 4W to each other in a mutually communicable manner.

Further, the second network N2 according to the present embodiment includes, for example, a detector hub HB, and connects the plurality of detectors 3, the detector hub HB, and the detection information processing ECU 4V to one another in a mutually communicable manner. The detector hub HB is a line concentrator that aggregates connection destinations of the plurality of detectors 3. The detector hub HB is interposed between the plurality of detectors 3 and the autonomous driving ECU 4W in a mutually communicable manner, and functions to aggregate detection information obtained by the plurality of detectors 3 and collectively transmit the detection information to the autonomous driving ECU 4W. Here, the detector hub HB is interposed between the plurality of detectors 3 and the detection information processing ECU 4V of the control device 4 in a mutually communicable manner, aggregates detection information obtained by the plurality of detectors 3, and collectively transmits the detection information to the detection information processing ECU 4V. For example, the detector hub HB receives the detection information from the plurality of detectors 3 and aggregates and temporarily stores the detection information in the storage unit. Then, the detector hub HB collectively transmits the detection information of each detector 3 aggregated and stored in the storage unit to the detection information processing ECU 4V at a predetermined timing in each predetermined data frame. Therefore, the detector hub HB can transmit the detection information to the detection information processing ECU 4V periodically and efficiently with as little empty data frame as possible. Then, the detection information processing ECU 4V collectively transmits, to the autonomous driving ECU 4W, the detection information obtained by the plurality of detectors 3 that is received from the detector hub HB.

Note that the in-vehicle system 1 according to the present embodiment further includes a storage device 6, in addition to the above-described components. The storage device 6 is installed in the vehicle V and stores various information. The storage device 6 may be a relatively large-capacity storage device such as a hard disk, a solid state drive (SSD), or an optical disk, or a semiconductor memory capable of rewriting data, such as a random access memory (RAM), a flash memory, or a non volatile static random access memory (NVSRAM). The storage device 6 stores, for example, various information related to operation records of the vehicle V and a traveling state of the vehicle V, information related to a state of occupants including the driver of the vehicle V, and information on the surroundings of the vehicle V. The storage device 6 may also be called a drive recorder, an event data recorder, or the like. The storage device 6 may constitute a so-called black box that is firmly protected against a strong impact or the like in the vehicle V. Further, the storage device 6 may be mounted in a portion that is adjacent to the center of gravity of the vehicle V and is firmly protected, in the vehicle V. The storage device 6 enables use of the stored information, for example, as a clue for investigating the cause of an accident in the vehicle V capable of performing the autonomous driving. Similar to the autonomous driving system device 5, the storage device 6 is communicably connected to the autonomous driving ECU 4W by two systems, the first network N1 and the second network N2. The storage device 6 is communicably connected to the safety system LAN N14 by the first network N1. Here, the second network N2 is not connected to devices other than the autonomous driving system device 5, the autonomous driving ECU 4W, and the storage device 6.

The in-vehicle system 1 described above can implement the autonomous driving of the vehicle V by the autonomous driving ECU 4W controlling the autonomous driving system device 5 and performing the control related to the autonomous driving of the vehicle V. In this case, in the in-vehicle system 1, the autonomous driving system device 5 and the autonomous driving ECU 4W are communicably connected to each other by the first network N1 and the second network N2 separate from the first network N1. The first network N1 connects the autonomous driving system device 5 and the autonomous driving ECU 4W to each other with the inter-network connection unit N10 interposed therebetween so as to perform communication with each other by using a plurality of different protocols. Meanwhile, the second network N2 connects the autonomous driving system device 5 and the autonomous driving ECU 4W without the inter-network connection unit N10 interposed therebetween so as to perform communication with each other by using a single protocol. With such a configuration, the in-vehicle system 1 can perform communication between the autonomous driving ECU 4W and each autonomous driving system device 5 by properly using two systems of the first network N1 or the second network N2 depending on a situation.

For example, the in-vehicle system 1 performs communication between the autonomous driving ECU 4W and each autonomous driving system device 5 by the second network N2 that is a communication network dedicated to the autonomous driving system, in preference to the first network N1. In this case, since the second network N2 is independent of the first network N1, the in-vehicle system 1 can perform transmission and reception of information related to the autonomous driving, separately from transmission and reception of other information. Accordingly, the in-vehicle system 1 can prevent communication for the information related to the autonomous driving from competing with other information communication and suppress an increase in communication traffic, and thus can ensure an appropriate communication speed. In addition, since the in-vehicle system 1 can perform communication for the information related to the autonomous driving using a single protocol by the second network N2, an operation load or a processing time related to protocol conversion can be reduced. In this respect as well, the in-vehicle system 1 can ensure an appropriate communication speed. As a result, the in-vehicle system 1 can perform a control related to the autonomous driving of the vehicle V with high responsiveness, and thus can suppress delay in the control and ensure an appropriate real-time property. In addition, the in-vehicle system 1 can prevent communication for information related to the autonomous driving from being mixed with other information communication, and thus can ensure appropriate reliability.

Further, for example, in a case where communication using the second network N2 does not work properly due to disconnection of a part of the second network N2, the in-vehicle system 1 performs communication between the autonomous driving ECU 4W and each autonomous driving system device 5 by using the first network N1 that is separate from the second network N2. As a result, the in-vehicle system 1 can ensure appropriate redundancy.

In addition, the in-vehicle system 1 can detect a system abnormality by, for example, comparing and collating information received by the autonomous driving ECU 4W through the first network N1 with information received by the autonomous driving ECU 4W through the second network N2. For example, in a case where the information received from a specific detector 3 through the first network N1 matches the information received from the specific detector 3 through the second network N2, the autonomous driving ECU 4W determines that the system is normal. On the other hand, in a case where the information received from a specific detector 3 through the first network N1 does not match the information received from the specific detector 3 through the second network N2, the autonomous driving ECU 4W can determine that a system abnormality has occurred between the specific detector 3 and the autonomous driving ECU 4W.

In addition, the existing in-vehicle system can be easily modified into the in-vehicle system 1 according to the present embodiment by, for example, additionally installing (add-on) the second network N2 separately from the first network N1 in the existing in-vehicle system including the first network N1.

As described above, the in-vehicle system 1 according to the present embodiment can ensure appropriate communication with the first network N1 and the second network N2.

Here, in the in-vehicle system 1 described above, the autonomous driving system device 5 includes the autonomous driving system operation device 51 and the autonomous driving system detection device 52. Further, the in-vehicle system 1 can ensure appropriate communication between the autonomous driving system operation device 51, the autonomous driving system detection device 52, and the autonomous driving ECU 4W with the first network N1 and the second network N2.

Further, in the in-vehicle system 1 described above, the plurality of detectors 3 constituting the autonomous driving system detection device 52 of the autonomous driving system device 5, and the autonomous driving ECU 4W can perform communication with each other through the detector hub HB interposed therebetween. In this case, the detector hub HB aggregates detection information obtained by the plurality of detectors 3 and transmits the detection information to the autonomous driving ECU 4W. For example, the in-vehicle system 1 tends to be required to be equipped with a wide variety of detectors 3 in accordance with the recent trend of autonomous driving of a vehicle. Even in this case, in the in-vehicle system 1, the detector hub HB can aggregate the detection information obtained by a wide variety of detectors 3 and collectively transmit the detection information to the autonomous driving ECU 4W, thus it is possible to suppress an increase in communication traffic and ensure an appropriate communication speed. In addition, in the in-vehicle system 1, connection destinations of the plurality of detectors 3 are aggregated by using the detector hub HB, such that it is possible to improve wiring workability when mounting a wide variety of detectors 3 in the vehicle V. In this respect as well, the in-vehicle system 1 and the detector hub HB can ensure appropriate communication.

Note that the in-vehicle system according to the embodiment of the present invention described above is not limited to the above-described embodiment, and various changes are possible without departing from the range described in the claims.

In the above description, the autonomous driving system device 5 has been described as including the autonomous driving system operation device 51 and the autonomous driving system detection device 52, but is not limited thereto. For example, the autonomous driving system device 5 may not include any one of the autonomous driving system operation device 51 and the autonomous driving system detection device 52.

In the above description, the second network N2 has been described as including the detector hub HB, but is not limited thereto.

The programs, applications, various data, and the like described above may be updated as appropriate. In addition, the programs, applications, various data, and the like described above can be downloaded in whole or in part as necessary. Further, for example, the processing functions of the control device 4 may be implemented in whole or in part by, for example, a CPU or the like and a program that is interpreted and executed by the CPU or the like, or may be implemented as hardware based on wired logic or the like.

The in-vehicle system according to the present embodiment can implement the autonomous driving of the vehicle by the autonomous driving controller controlling the autonomous driving system device and performing the control related to the autonomous driving of the vehicle. In this case, in the in-vehicle system, the autonomous driving system device and the autonomous driving controller are communicably connected to each other by the first network and the second network separate from the first network. The first network communicably connects the autonomous driving system device and the autonomous driving controller to each other with a protocol conversion unit interposed therebetween so as to perform communication with each other by using a plurality of different protocols. Meanwhile, the second network connects the autonomous driving system device and the autonomous driving controller to each other without the protocol conversion unit interposed therebetween so as to perform communication with each other by using a single protocol. As a result, the in-vehicle system has an effect that appropriate communication can be ensured with the first network and the second network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An in-vehicle system comprising:
an autonomous driving system device that is mounted in a vehicle and implements autonomous driving of the vehicle;

an autonomous driving controller that is configured to control the autonomous driving system device to perform a control related to the autonomous driving of the vehicle;
a first network that connects the autonomous driving system device and the autonomous driving controller with a protocol conversion unit interposed therebetween so as to perform communication with each other by using a plurality of different protocols, the protocol conversion unit performing protocol conversion; and
a second network that connects the autonomous driving system device and the autonomous driving controller without the protocol conversion unit interposed therebetween so as to perform communication with each other by using a single protocol, wherein
the autonomous driving system device includes an autonomous driving system operation device comprising a processor that executes the autonomous driving controller to implement the autonomous driving of the vehicle, and an autonomous driving system detection device comprising a sensor that obtains detection information used for the autonomous driving of the vehicle and outputs the detection information to the autonomous driving controller,
the first network connects the autonomous driving system operation device and the autonomous driving system detection device, and the autonomous driving controller with the protocol conversion unit interposed therebetween so as to perform communication with each other, and
the second network connects the autonomous driving system operation device and the autonomous driving system detection device, and the autonomous driving controller without the protocol conversion unit interposed therebetween so as to perform communication with each other, wherein
the autonomous driving system detection device outputs the detection information onto the first network and the second network, and
the autonomous driving controller detects an abnormality of the in-vehicle system by determining whether the detection information received from a specific detector through the first network matches the detection information received from the specific detector through the second network.

2. The in-vehicle system according to claim 1, wherein
the autonomous driving system detection device includes a plurality of detectors that obtain the detection information, and
the second network includes a detector hub that is interposed between the plurality of detectors and the autonomous driving controller in a mutually communicable manner, aggregates the detection information obtained by the plurality of detectors, and transmits the detection information to the autonomous driving controller.

3. The in-vehicle system according to claim 1, wherein
when the detection information received from the first network does not match the detection information received from the second network, the in-vehicle system performs communication between the autonomous driving controller and the autonomous driving system device by using the first network.

* * * * *